US006901518B1

(12) United States Patent
Scheifler et al.

(10) Patent No.: US 6,901,518 B1
(45) Date of Patent: May 31, 2005

(54) METHOD AND SYSTEM FOR ESTABLISHING TRUST IN DOWNLOADED PROXY CODE

(75) Inventors: Robert W. Scheifler, Somerville, MA (US); James H. Waldo, Dracut, MA (US); Peter C. Jones, Winchester, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/543,908

(22) Filed: Apr. 6, 2000

Related U.S. Application Data
(60) Provisional application No. 60/128,406, filed on Apr. 8, 1999.

(51) Int. Cl.[7] .................................................. H04L 9/00
(52) U.S. Cl. ........................ 713/201; 713/176; 709/223
(58) Field of Search ................................ 713/156, 175, 713/176, 200–202; 709/223, 224; 717/120, 174, 176–178

(56) References Cited

U.S. PATENT DOCUMENTS

| | | | |
|---|---|---|---|
| 4,430,699 A | 2/1984 | Segarra et al. |
| 4,491,946 A | 1/1985 | Kryskow, Jr. et al. |
| 4,558,413 A | 12/1985 | Schmidt et al. |
| 4,567,359 A | 1/1986 | Lockwood |
| 4,713,806 A | 12/1987 | Oberlander et al. |
| 4,809,160 A | 2/1989 | Mahon et al. |
| 4,823,122 A | 4/1989 | Mann et al. |
| 4,939,638 A | 7/1990 | Stephenson et al. |
| 4,956,773 A | 9/1990 | Saito et al. |
| 4,992,940 A | 2/1991 | Dworkin |
| 5,088,036 A | 2/1992 | Ellis et al. |
| 5,101,346 A | 3/1992 | Ohtsuki |
| 5,109,486 A | 4/1992 | Seymour |
| 5,187,787 A | 2/1993 | Skeen et al. |
| 5,218,699 A | 6/1993 | Brandle et al. |
| 5,253,165 A | 10/1993 | Leiseca et al. |
| 5,257,369 A | 10/1993 | Skeen et al. |

(Continued)

FOREIGN PATENT DOCUMENTS

| | | |
|---|---|---|
| EP | 0 300 516 A2 | 1/1989 |
| EP | 0 351 536 A3 | 1/1990 |

(Continued)

OTHER PUBLICATIONS

"Java (TM) Remote Method Invocation Specification", Sun Microsystems, Inc., (1997), java.sun.com/products/jdk1.2beta1.

(Continued)

*Primary Examiner*—Ayaz Sheikh
*Assistant Examiner*—Christopher Revak
(74) *Attorney, Agent, or Firm*—Finnegan, Henderson, Farabow, Garrett & Dunner, L.L.P.

(57) ABSTRACT

A system consistent with the present invention enables a program in a distributed system to determine whether downloaded code is trustworthy before using the downloaded code to communicate with other programs or services in the distributed system. A client that downloads proxy code from a service can verify that both the service and the downloaded code are trustworthy before using the code to communicate with the service. "Trustworthy" code is code the client knows will enforce the client's security constraints in communicating with the service, e.g., mutual authentication, confidentiality, and integrity.

13 Claims, 5 Drawing Sheets

U.S. PATENT DOCUMENTS

| | | |
|---|---|---|
| 5,293,614 A | 3/1994 | Ferguson et al. |
| 5,297,283 A | 3/1994 | Kelly, Jr. et al. |
| 5,303,042 A | 4/1994 | Lewis et al. |
| 5,307,490 A | 4/1994 | Davidson et al. |
| 5,311,591 A | 5/1994 | Fischer |
| 5,319,542 A | 6/1994 | King, Jr. et al. |
| 5,327,559 A | 7/1994 | Priven et al. |
| 5,339,435 A | 8/1994 | Lubkin et al. |
| 5,386,568 A | 1/1995 | Wold et al. |
| 5,390,328 A | 2/1995 | Frey et al. |
| 5,392,280 A | 2/1995 | Zheng |
| 5,423,042 A | 6/1995 | Jalili et al. |
| 5,440,744 A | 8/1995 | Jacobson et al. |
| 5,446,901 A | 8/1995 | Owicki et al. |
| 5,448,740 A | 9/1995 | Kiri et al. |
| 5,452,459 A | 9/1995 | Drury et al. |
| 5,455,952 A | 10/1995 | Gjovaag |
| 5,459,837 A | 10/1995 | Caccavale |
| 5,471,629 A | 11/1995 | Risch |
| 5,475,792 A | 12/1995 | Stanford et al. |
| 5,475,817 A | 12/1995 | Waldo et al. |
| 5,475,840 A | 12/1995 | Nelson et al. |
| 5,481,721 A | 1/1996 | Serlet et al. |
| 5,504,921 A | 4/1996 | Dev et al. |
| 5,506,984 A | 4/1996 | Miller |
| 5,511,196 A | 4/1996 | Shackelford et al. |
| 5,511,197 A | 4/1996 | Hill et al. |
| 5,524,244 A | 6/1996 | Robinson et al. |
| 5,544,040 A | 8/1996 | Gerbaulet |
| 5,548,724 A | 8/1996 | Akizawa et al. |
| 5,548,726 A | 8/1996 | Pettus |
| 5,553,282 A | 9/1996 | Parrish et al. |
| 5,555,367 A | 9/1996 | Premerlani et al. |
| 5,555,427 A | 9/1996 | Aoe et al. |
| 5,557,798 A | 9/1996 | Skeen et al. |
| 5,560,003 A | 9/1996 | Nilsen et al. |
| 5,561,785 A | 10/1996 | Blandy et al. |
| 5,577,231 A | 11/1996 | Scalzi et al. |
| 5,592,375 A | 1/1997 | Salmon et al. |
| 5,594,921 A | 1/1997 | Pettus |
| 5,603,031 A | 2/1997 | White et al. |
| 5,617,537 A | 4/1997 | Yamada et al. |
| 5,628,005 A | 5/1997 | Hurvig |
| 5,640,564 A | 6/1997 | Hamilton et al. |
| 5,644,720 A | 7/1997 | Boll et al. |
| 5,644,768 A | 7/1997 | Periwal et al. |
| 5,652,888 A | 7/1997 | Burgess |
| 5,655,148 A | 8/1997 | Richman et al. |
| 5,659,751 A | 8/1997 | Heninger |
| 5,664,110 A | 9/1997 | Green et al. |
| 5,664,111 A | 9/1997 | Nahan et al. |
| 5,664,191 A * | 9/1997 | Davidson et al. ........... 709/100 |
| 5,666,493 A | 9/1997 | Wojcik et al. |
| 5,671,225 A | 9/1997 | Hooper et al. |
| 5,671,279 A | 9/1997 | Elgamal |
| 5,675,796 A | 10/1997 | Hodges et al. |
| 5,675,797 A | 10/1997 | Chung et al. |
| 5,680,573 A | 10/1997 | Rubin et al. |
| 5,680,617 A | 10/1997 | Gough et al. |
| 5,684,955 A | 11/1997 | Meyer et al. |
| 5,689,709 A | 11/1997 | Corbett et al. |
| 5,694,551 A | 12/1997 | Doyle et al. |
| 5,706,435 A | 1/1998 | Barbara et al. |
| 5,706,502 A | 1/1998 | Foley et al. |
| 5,710,887 A | 1/1998 | Chelliah et al. |
| 5,715,314 A | 2/1998 | Payne et al. |
| 5,721,832 A | 2/1998 | Westrope et al. |
| 5,724,540 A | 3/1998 | Kametani |
| 5,724,588 A | 3/1998 | Hill et al. |
| 5,727,048 A | 3/1998 | Hiroshima et al. |
| 5,727,145 A | 3/1998 | Nessett et al. |
| 5,729,594 A | 3/1998 | Klingman |
| 5,737,607 A | 4/1998 | Hamilton et al. |
| 5,742,768 A | 4/1998 | Gennaro et al. |
| 5,745,678 A | 4/1998 | Herzberg et al. |
| 5,745,695 A | 4/1998 | Gilchrist et al. |
| 5,745,703 A | 4/1998 | Cejtin et al. |
| 5,745,755 A | 4/1998 | Covey |
| 5,748,897 A | 5/1998 | Katiyar |
| 5,754,849 A | 5/1998 | Dyer et al. |
| 5,754,977 A | 5/1998 | Gardner et al. |
| 5,757,925 A | 5/1998 | Faybishenko |
| 5,758,077 A | 5/1998 | Danahy et al. |
| 5,758,328 A | 5/1998 | Giovannoli |
| 5,758,344 A | 5/1998 | Prasad et al. |
| 5,761,507 A | 6/1998 | Govett |
| 5,761,656 A | 6/1998 | Ben-Shachar |
| 5,764,897 A | 6/1998 | Khalidi |
| 5,764,915 A | 6/1998 | Heimsoth et al. |
| 5,768,532 A | 6/1998 | Megerian |
| 5,774,551 A | 6/1998 | Wu et al. |
| 5,774,729 A | 6/1998 | Carney et al. |
| 5,778,179 A | 7/1998 | Kanai et al. |
| 5,778,187 A | 7/1998 | Monteiro et al. |
| 5,778,228 A | 7/1998 | Wei |
| 5,778,368 A | 7/1998 | Hogan et al. |
| 5,784,560 A | 7/1998 | Kingdon et al. |
| 5,787,425 A | 7/1998 | Bigus |
| 5,787,431 A | 7/1998 | Shaughnessy |
| 5,790,548 A | 8/1998 | Sistanizadeh et al. |
| 5,790,677 A | 8/1998 | Fox et al. |
| 5,794,207 A | 8/1998 | Walker et al. |
| 5,799,173 A | 8/1998 | Gossler et al. |
| 5,802,367 A | 9/1998 | Held et al. |
| 5,805,805 A | 9/1998 | Civanlar et al. |
| 5,808,911 A | 9/1998 | Tucker et al. |
| 5,809,144 A | 9/1998 | Sirbu et al. |
| 5,809,507 A | 9/1998 | Cavanaugh, III |
| 5,812,819 A | 9/1998 | Rodwin et al. |
| 5,813,013 A | 9/1998 | Shakib et al. |
| 5,815,149 A | 9/1998 | Mutschler, III et al. |
| 5,815,709 A | 9/1998 | Waldo et al. |
| 5,815,711 A | 9/1998 | Sakamoto et al. |
| 5,818,448 A | 10/1998 | Katiyar |
| 5,829,022 A | 10/1998 | Watanabe et al. |
| 5,832,219 A | 11/1998 | Pettus |
| 5,832,529 A | 11/1998 | Wollrath et al. |
| 5,832,593 A | 11/1998 | Wurst et al. |
| 5,835,737 A | 11/1998 | Sand et al. |
| 5,842,018 A | 11/1998 | Atkinson et al. |
| 5,844,553 A | 12/1998 | Hao et al. |
| 5,845,090 A | 12/1998 | Collins, III et al. |
| 5,845,129 A | 12/1998 | Wendorf et al. |
| 5,850,442 A | 12/1998 | Muftic |
| 5,860,004 A | 1/1999 | Fowlow et al. |
| 5,860,153 A | 1/1999 | Matena et al. |
| 5,864,862 A | 1/1999 | Kriens et al. |
| 5,864,866 A | 1/1999 | Henckel et al. |
| 5,872,928 A | 2/1999 | Lewis et al. |
| 5,872,973 A | 2/1999 | Mitchell et al. |
| 5,875,335 A | 2/1999 | Beard |
| 5,878,411 A | 3/1999 | Burroughs et al. |
| 5,884,024 A | 3/1999 | Lim et al. |
| 5,884,079 A | 3/1999 | Furusawa |
| 5,887,134 A | 3/1999 | Ebrahim |
| 5,889,951 A | 3/1999 | Lombardi |
| 5,890,158 A | 3/1999 | House et al. |
| 5,892,904 A | 4/1999 | Atkinson et al. |
| 5,933,497 A | 8/1999 | Beetcher et al. |
| 5,933,647 A | 8/1999 | Aronberg et al. |
| 5,935,249 A | 8/1999 | Stern et al. |

| | | |
|---|---|---|
| 5,940,827 A | 8/1999 | Hapner et al. |
| 5,944,793 A | 8/1999 | Islam et al. |
| 5,946,485 A | 8/1999 | Weeren et al. |
| 5,946,694 A | 8/1999 | Copeland et al. |
| 5,951,652 A | 9/1999 | Ingrassia, Jr. et al. |
| 5,956,509 A | 9/1999 | Kevner |
| 5,961,582 A | 10/1999 | Gaines |
| 5,963,924 A | 10/1999 | Williams et al. |
| 5,966,531 A | 10/1999 | Skeen et al. |
| 5,969,967 A | 10/1999 | Aahlad et al. |
| 5,974,201 A | 10/1999 | Chang et al. |
| 5,978,484 A | 11/1999 | Apperson et al. |
| 5,982,773 A | 11/1999 | Nishimura et al. |
| 5,987,506 A | 11/1999 | Carter et al. |
| 5,991,808 A | 11/1999 | Broder et al. |
| 5,996,075 A | 11/1999 | Matena |
| 5,999,179 A | 12/1999 | Kekic et al. |
| 5,999,988 A | 12/1999 | Pelegri-Llopart et al. |
| 6,003,050 A | 12/1999 | Silver et al. |
| 6,003,763 A | 12/1999 | Gallagher et al. |
| 6,009,103 A | 12/1999 | Woundy |
| 6,009,413 A | 12/1999 | Webber et al. |
| 6,009,464 A | 12/1999 | Hamilton et al. |
| 6,016,496 A | 1/2000 | Roberson |
| 6,016,516 A | 1/2000 | Horikiri |
| 6,023,586 A | 2/2000 | Gaisford et al. |
| 6,026,414 A | 2/2000 | Anglin |
| 6,031,977 A | 2/2000 | Pettus |
| 6,032,151 A | 2/2000 | Arnold et al. |
| 6,034,925 A | 3/2000 | Wehmeyer |
| 6,044,381 A | 3/2000 | Boothby et al. |
| 6,052,761 A | 4/2000 | Hornung et al. |
| 6,055,562 A | 4/2000 | Devarakonda et al. |
| 6,058,381 A | 5/2000 | Nelson |
| 6,058,383 A | 5/2000 | Narasimhalu et al. |
| 6,061,699 A | 5/2000 | DiCecco et al. |
| 6,061,713 A | 5/2000 | Bharadhwaj |
| 6,067,575 A | 5/2000 | McManis et al. |
| 6,078,655 A | 6/2000 | Fahrer et al. |
| 6,085,255 A | 7/2000 | Vincent et al. |
| 6,092,194 A * | 7/2000 | Touboul ............... 713/200 |
| 6,093,216 A | 7/2000 | Adl-Tabatabai et al. |
| 6,104,716 A * | 8/2000 | Crichton et al. ........... 370/401 |
| 6,108,346 A | 8/2000 | Doucette et al. |
| 6,134,603 A | 10/2000 | Jones et al. |
| 6,154,844 A * | 11/2000 | Touboul et al. .......... 713/201 |
| 6,157,960 A | 12/2000 | Kaminsky et al. |
| 6,182,083 B1 | 1/2001 | Scheifler et al. |
| 6,185,602 B1 | 2/2001 | Bayrakeri |
| 6,185,611 B1 | 2/2001 | Waldo et al. |
| 6,189,046 B1 | 2/2001 | Moore et al. |
| 6,192,044 B1 | 2/2001 | Mack |
| 6,199,068 B1 | 3/2001 | Carpenter |
| 6,199,116 B1 | 3/2001 | May et al. |
| 6,212,578 B1 | 4/2001 | Racicot et al. |
| 6,216,158 B1 | 4/2001 | Luo et al. |
| 6,219,675 B1 | 4/2001 | Pal et al. |
| 6,226,746 B1 | 5/2001 | Scheifler |
| 6,243,716 B1 | 6/2001 | Waldo et al. |
| 6,243,814 B1 | 6/2001 | Matena |
| 6,247,091 B1 | 6/2001 | Lovett |
| 6,253,256 B1 | 6/2001 | Wollrath et al. |
| 6,263,350 B1 | 7/2001 | Wollrath et al. |
| 6,263,379 B1 | 7/2001 | Atkinson et al. |
| 6,272,559 B1 | 8/2001 | Jones et al. |
| 6,282,295 B1 | 8/2001 | Young et al. |
| 6,282,568 B1 | 8/2001 | Sondur et al. |
| 6,282,581 B1 | 8/2001 | Moore et al. |
| 6,292,934 B1 * | 9/2001 | Davidson et al. ........... 717/158 |
| 6,339,783 B1 | 1/2002 | Horikiri |
| 6,343,308 B1 | 1/2002 | Marchesseault |
| 6,385,643 B1 | 5/2002 | Jacobs et al. |
| 6,408,342 B1 | 6/2002 | Moore et al. |
| 6,578,074 B1 | 6/2003 | Bahlmann |
| 6,654,793 B1 | 11/2003 | Wollrath et al. |
| 6,792,466 B1 * | 9/2004 | Saulpaugh et al. ......... 709/229 |
| 2002/0059212 A1 | 5/2002 | Takagi |

FOREIGN PATENT DOCUMENTS

| | | |
|---|---|---|
| EP | 0 384 339 A3 | 8/1990 |
| EP | 0 472 874 A1 | 3/1992 |
| EP | 0 474 340 A2 | 3/1992 |
| EP | 497 022 A1 | 8/1992 |
| EP | 0 555 997 A2 | 8/1993 |
| EP | 0 565 849 A2 | 10/1993 |
| EP | 0 569 195 A3 | 11/1993 |
| EP | 0 625 750 A2 | 11/1994 |
| EP | 0 635 792 A2 | 1/1995 |
| EP | 0 651 328 A1 | 5/1995 |
| EP | 0 660 231 A2 | 6/1995 |
| EP | 0 697 655 A2 | 2/1996 |
| EP | 0 718 761 A1 | 6/1996 |
| EP | 0 767 432 A2 | 4/1997 |
| EP | 0 778 520 A2 | 6/1997 |
| EP | 0 794 493 A2 | 9/1997 |
| EP | 0 803 810 A2 | 10/1997 |
| EP | 0 803 811 A2 | 10/1997 |
| EP | 0 805 393 A2 | 11/1997 |
| EP | 0 810 524 A1 | 12/1997 |
| EP | 0 817 020 A2 | 1/1998 |
| EP | 0 817 022 A2 | 1/1998 |
| EP | 0 817 025 A2 | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO 92/07335 A1 | 4/1992 |
| WO | WO 92/09948 A1 | 6/1992 |
| WO | WO93/25962 A1 | 12/1993 |
| WO | WO 94/03855 A1 | 2/1994 |
| WO | WO 96/03692 A1 | 2/1996 |
| WO | WO 96/10787 A1 | 4/1996 |
| WO | WO 96/18947 A1 | 6/1996 |
| WO | WO 96/24099 A1 | 8/1996 |
| WO | WO 98/02814 A1 | 1/1998 |
| WO | WO 98/04971 A1 | 2/1998 |
| WO | WO 98/21683 A2 | 5/1998 |
| WO | WO 99/17194 | 4/1999 |
| WO | WO 01/13228 A2 | 2/2001 |
| WO | WO 01/86394 A2 | 11/2001 |
| WO | WO 01/90903 A1 | 11/2001 |

OTHER PUBLICATIONS

"Transparent Network Computing", Locus Computing Corporation, Jan. 5, 1995, www.locus.com (copyright 1995) pp. 1–7.

Agha et al., "Actorspaces: An Open Distributed Programming Paradigm" University of Illinois, Report No. UIUCDCS–R–92–1766, Open Systems Laboratory TR No. 8, Nov. 1992, pp. 1–12.

Ahmed et al., "A Program Building Tool for Parallel Applications", Yale University, Dec. 1, 1993, pp. 1–23.

Alexander et al., "Active Bridging", Proceedings of the ACM/SIGCOMM'97 Conference, Cannes, France, 9/97.

Anderson et al., "Persistent Linda: Linda + Transactions + Query Processing", Proceedings of the 13th Symposium on Fault Tolerant Systems, 1991, pp. 93–109.

Anonymous: "Change–Notification Service for Shared Files", IBM Technical Disclosure Bulletin, vol. 36, No. 8, pp. 77–82, XP002108713 New York, US.

Anonymous: "Resource Preemption for Priority Scheduling." Nov. 1973. IBM Technical Disclosure Bulletin, vol. 16, No. 6, p. 1931 XP002109435 New York, US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–Oriented Database Management Systems: Concepts and Issues," Computer, vol. 24, No. 4, pp. 33–47, (Apr. 1991), Los Alamitos, CA.

Betz, Mark; "Interoperable objects: laying the foundation for distributed object computing"; Dr. Dobb's Journal, vol. 19, No. 11, p. 18(13); (Oct. 1994).

Bevan, D.I., "An Efficient Reference Counting Solution To The Distributed Garbage Collection Problem", Parall Computing, NL, Elsevier Publishers, Amsterdam, vol. 9, No. 2, pp. 179–192.

Birrell et al., "Distributed Garbage Collection for Network Objects", Digital Systems Research Center, No. 116, pp. 1–18, Dec. 15, 1993.

Birrell et al., "Grapevine: An Exercise in Distributed Computing", Communications of the ACM, vol. 25, No. 4, Apr. 1982, pp. 260–274.

Birrell et al., "Implementing Remote Procedure Calls", ACM Transactions on Computer Systems, vol. 2, No. 1, Feb. 1984, pp. 39–59.

Birrell et al., "Network Objects", DEC SRC Research Report 115, Feb. 28, 1994.

Birrell, Andrew, et al., "Network Objects," Operating Systems Review, 27(5), Dec. 1993, pp. 217–230.

Cannon et al., "Adding Fault–Tolerant Transaction Processing to LINDA", Software–Practice and Experience, vol. 24(5), May 1994, pp. 449–466.

Cardelli, "Obliq, A lightweight language for network objects", Digital SRC, Nov. 5, 1993, pp. 1–37.

Carriero et al., "Distributed Data Structures in Linda", Principles of Programming Language, 1986, pp. 1–16.

Carriero et al., "Distributed Data Structures in Linda", Yale Research Report YALEU/DCS/RR–438, Nov. 1985.

Chung, et al., "A 'Tiny' Pascal Compiler: Part 1: The P–Code Interpreter," BYTE Publications, Inc., Sep. 1978.

Chung, et al., "A 'Tiny' Pascal Compiler: Part 2: The P–Compiler," BYTE Publications, Inc., Oct. 1978.

Coulouris et al., "Distributed Systems Concepts and Designs", Second Edition, Addison–Wesley, 1994.

Dave A et al: "Proxies Application Interface, and Distributed Systems", Proceedings International Workshop on Object Orientation in Operating Systems, Sep. 24, 1992, pp. 212–220.

Deux O et al: "The 02 System" Communications of the Association for Computing Machinery, vol. 34, No. 10, Oct. 1, 1991, pp. 34–48.

Dijkstra, "Self–stabilizing Systems in Spite of Distributed Control", Communications of the ACM, vol. 17, No. 11, Nov. 1974, pp. 643–644.

Dolev et al., "On the Minimal Synchronism Needed for Distributed Consensus", Journal of the ACM, vol. 34, No. 1, Jan. 1987, pp. 77–97.

Dourish, "A Divergence–Based Model of Synchrony and Distribution in Collaborative Systems", Xerox Technical Report EPC–1194–102, 1994, pp. 1–10.

Drexler, K. Eric, et al., "Incentive Engineering for Computational Resource Management," The Ecology of Computation, Elsevier Science Publishers B.V., 1988, pp. 231–266.

Droms, R., "RFC 1541 Dynamic Host Configuration Protocol", http://www.cis.ohio–state.edu/htbin/rfc/rfc1541.html, Oct. 1993, pp. 1–33.

Emms J: "A Definition of an Access Control Systems Language" Computer Standards and Interfaces, vol. 6, No. 4, Jan. 1, 1987, pp. 443–454.

Gelernter et al., "Parallel Programming in Linda", Yale University, Jan. 1985, pp. 1–21.

Gelernter et al., "Generative Communication in Linda", ACM Transactions on Programming Languages and Systems, vol. 7, No. 1, Jan. 1985, pp. 80–112.

Gosling et al., "The Java (TM) Language Specification", Addison–Wesley, 1996.

Gottlob et al., "Extending Object–Oriented Systems with Roles," ACM Transactions on information systems, vol. 14, No. 3, pp. 268–296 (Jul. 1996).

Gray, Cary G., et al., "Leases: An Efficient Fault–Tolerant Mechanism for Distributed File Cache Consistency," ACM, 1989, pp. 202–210.

Guth, Rob: "JavaOne: Sun to Expand Java Distributed Computing Effort", "http://www.sunworld.com/swol–02–1998/swol–02–sunspots.html," XP–002109935, P.1, 1998.

Hamilton et al., "Subcontract: a flexible base for distributed programming"; Proceedings of 14th Symposium of Operating System Principles; (Dec. 1993).

Hamilton, Marc A., "Java and the Shift to Net–Centric Computing." Computer, Aug. 1996, pp. 31–39.

Harris et al., "Proposal for a General Java Proxy Class for Distributed Systems and Other Uses", Netscape Communications Corp., Jun. 25, 1997.

Hartman, J., Manber, U., et al., Liquid Software: A new paradigm for networked systems, Technical Report 96–11, Department of Comp. Sci., Univ. of Arizona, 6/96.

Howard et al., "Scale and Performance in a Distributed File System", ACM Transactions on Computer Systems, vol. 6, No. 1, Feb. 1988, pp. 51–81.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM: "Chapter 6—Distributed SOM (DSOM)" SOMobjects Developer Toolkit Users Guide, Version 2.1, Oct. 1994 (1994–10), pp. 6–1–6–90.

Jaworski, "Java 1.1 Developer's Guide, 2nd Edition", Sams.net, 1997.

Jones, Richard, et al., "Garbage Collection: Algorithms for Automatic Dynamic Memory Management," pp. 165–175, John Wiley & Sons, 1996.

Kambhatla et al., "Recovery with Limited Replay: Fault–Tolerant Processes in Linda", Oregon Graduate Institute, Technical Report CSIE 90–019, Sep. 1990, pp. 1–16.

Kay, Michael H. et al., "An Overview of the Raleigh Object–Oriented Database System", ICL Technical Journal, vol. 7, No. 4, pp. 780–798, (Nov. 1991), Oxford, GB.

Kougiouris et al.; "Support for Space Efficient Object Invocation in Spring"; (Sep. 1994).

Krasner, "The Smalltalk–80 Virtual Machine", BYTE Publications Inc., Aug. 1991, pp. 300–320.

Lamport et al., "The Byzantine Generals Problem", ACM Transactions on Programming Languages and Systems, vol. 4, No. 3, Jul. 1982, pp. 382–401.

LINDA Database Search, Jul. 20, 1995, pp. 1–68.

Lindholm et al., "The Java (TM) Virtual Machine Specification", Addison Wesley, 1996.

Liskov et al., "Distributed Object Management in Thor", International Workshop on Distributed Object Management, 1992, pp. 12.

McDaniel, Gene, "An Analysis of a Mesa Instruction Set," Xerox Corporation, May 1982.

Mitchell et al., "Mesa Language Manual", Xerox Corporation.

Mitchell et al.; "An Overview of the Spring System"; (Feb. 1994).

Mullender, "Distributed Systems", Second Edition, Addison–Wesley, 1993.

Mummert et al., "Long Term Distributed File Reference Tracing: Implementation and Experience", Carnegie Mellon University School of Computer Science, Nov. 1994, pp. 1–28.

Orfali R. et al., "The Essential Distributed Objects Survival Guide," Chapter 11: Corba Commercial ORBs, pp. 203–215, John Wiley & Sons, Inc., (1996).

Ousterhout et al., "The Sprite Network Operating System", Computer, IEEE, Feb. 1988, pp. 23–36.

Pier, Kenneth A., "A Retrospective on the Dorando, A High–Performance Personal Computer," IEEE Conference Proceedings, The 10th Annual International Symposium on Computer Architecture, 1983.

Pier, Kenneth A., "A Retrospective on the Dorando, A High–Performance Personal Computer," Xerox Corporation, Aug. 1983.

Pinakis, "Using Linda as the Basis of an Operating System Microkernel", University of Western Australia, Department of Computer Science, Aug. 1993, pp. 1–165.

Riggs Roger et al., "Pickling State in the Java (TM) System," USENIX Association Conference on Object–Oriented Technologies and Systems, XP–002112719, Jun. 17–21, 1996, pp. 241–250.

Rosenberry et al., "Understanding DCE"; Chapters 1–3, 6; (1992).

Sharrott et al., "ObjectMap: Integrating High Performance Resources into a Distributed Object–oriented Environment," ICODP, 1995.

Thompson, Ken, "Regular Expression Search Algorithm," Communications of the ACM, vol. II, No. 6, p. 149 et seq., Jun. 1968.

Venners, B., "Jini Technology, Out of the Box", JAVA-WORLD, 'Online!, pp 1–4, Dec. 1998.

Waldo J et al: "Events in an RPC based distributed system" Proceedings of the 1995 USENIX Technical Conference, Proceedings USENIX Winter 1995 Technical Conference, New Orleans, LA. USA, Jan. 16–20, 1995, pp. 131–142.

Wilson, P.R., et al., "Design of the Opportunistic Garbage Collector," Proceedings of the Object Oriented Programming Systems Languages And Applications Conference, New Orleans, vol. 24, No. 10, Oct. 1989.

Wollrath et al., "A Distributed Object Model for the Java (TM) System", USENIX Association, Conference on Object–Oriented Technologies and Systems, Jun. 17–21, 1996.

Wu, Xuequn, "A Type system for an Object–Oriented Database System," Proceedings of the International Computer Software and Applications Conference (COMPSAC), pp. 333–338, Sep. 11–13, 1991, Tokyo, Japan.

Yemini, Y. and S. da Silva, "Towards Programmable Networks", IFIP/IEEE International Workshop on Distributed Systems: Operations and Management, L'Aquila, Italy, 10/96.

Yin J. et al., "Using Leases to Support Server Driven Consistency in Large–Scale Systems", Computer Services Department, University of Texas at Austin, p. 285–294.

H.A. Smith and J.D. McKeen, "Object–Oriented Technology: Getting Beyond the Hype," ACM, Spring 1996, vol. 27, pp. 20–29.

Java Remote Method Invocation Specification, JDK 1.1 FCS, Sun Microsystems, Inc. Feb. 1997, chapters 5 and 7.

Jennings, N.R. et al., "Using Intelligent Agents to Manage Business Processes," Dept. Electronic Engineering, Queen Mary & Westfield College, Mile End Road, London, E1 4NS, U.K., XP–002254546, 1996, 16 pages.

Malkhi, D. et al., "Secure Execution of Java Applets using a Remote Playground", IEEE Symposium on Security and Privacy, vol. Conf. 19, May 3, 1998 (1998–05–03), pp. 40–51, XP000825828.

MacGregor R. et al., "Java Network Security", IBM 1998, Prentice Hall Ptr, Upper Sadler River, NJ, XP002147742, pp. 29, 48–49, 51, 164–167.

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Burns et al., "An Analytical Study of Opportunistic Lease Renewal," Distributed Computing Systems, 21st International Conference, pp. 146–153, Apr. 2000.

Dollimore et al., "The Design of a System for Distributing Shared Objects," The Computer Journal, No. 6, Cambridge, GB, Dec. 1991.

Fleisch et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Gray et al., "Leases: An Efficient Fault–Tolerant Mechanism for Distributed File Cache Consistency," Proceedings of the 12th ACM Symposium on Operating Systems Principles, pp. 202–210, 1989.

Guyennet et al., "A New Consistency Protocol Implemented in the CAliF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

Hoshi et al., "Allocation of the Cross–Connect Function in Leased Circuit Networks," 1992, ICC'92, conference record, SUPERCOMM/ICC '02, D a New World of Communications, IEEE International Conference, pp. 1408–1412.

IBM Technical Disclosure Bulletin, "Local Network Monitoring to Populate Access Agent Directory," vol. 36, No. 09A, pp. 403–405, Sep. 1993.

McGrath, "Discovery and Its Discontents: Discovery Protocols for Ubiquitous Computing," Presented at Center for Excellence in Space Data and Information Science, NASA Goddard Space Flight Center, Apr. 5, 2000.

MUX–Elektronik, Java 1.1 Interactive Course, www.lis.se/~mux/javaic.html, 1995.

Stevenson, "Token–Based Consistency of Replicated Servers," IEEE, CH2686–4/89/0000/0179, pp. 179–183, 1989.

Yin et al., "Volume Leases for Consistency in Large–Scale Systems," IEEE Transactions on Knowledge & Data Engineering, vol. 11, No. 4, pp. 563–576, Jul./Aug. 1999.

Douglas Hodges, "Managing Object Lifetimes in OLE"; Aug. 25, 1994, pp. 1–41.

"Eden Project Proposal," Department of Computer Science, University of Washington, Oct. 1980, Technical Report #80–10–01, cover and Foreword.

Almes et al., "Edmas: A Locally Distributed Mail System," Department of Computer Science, University of Washington, Technical Report 83–07–01, Jul. 7, 1983, Abstract & pp. 1–17.

Almes et al., "Research in Integrated Distributing Computing," Department of Computer Science, University of Washington, Oct. 1979, pp. 1–42.

Almes et al., "The Eden System: A Technical Review," Department of Computer Science, University of Washington, Technical Report 83–10–05, Oct. 1983, pp. 1–25.

Almes, "Integration and Distribution in the Eden System," Department of Computer Science, University of Washington, Technical Report 83–01–02, Jan. 19, 1983, pp. 1–18 & Abstract.

Almes, "The Evolution of the Eden Invocation Mechanism," Department of Computer Science, University of Washington, Technical Report 83–01–03, Jan. 19, 1983, pp. 1–14 & Abstract.

Arnold, Ken, "The Jini Architecture: Dynamic Services in a Flexible Network," Sun Microsystems, Inc., Proceedings of the 36th ACM IEEE Design Automation Conference, Jun. 1999, pp. 157–162.

Begole et al., "Transparent Sharing of Java Applets: A Replicated Approach," Oct. 1997, pp. 55–65.

Black et al., "A Language for Distributed Programming," Department of Computer Science, University of Washington, Technical Report 86–02–03, Feb. 1986, p. 1–10.

Black et al., "Distribution and Abstract Types in Emerald," University of Washington, Technical Report No. 85–08–05, Aug. 1985, pp. 1–10.

Black et al., "Object Structure in the Emerald System," University of Washington, Technical Report 86–04–03, Apr. 1986, pp. 1–14.

Black et al., "The Eden Project: A Final Report," Department of Computer Science, University of Washington, Technical Report 86–11–01, Nov. 1986, pp. 1–28.

Black, "Supporting Distributed Applications: Experience with Eden," Department of Computer Science, University of Washington, Technical Report 85–03–02, Mar. 1985, pp. 1–21.

Black, "The Eden Programming Language", Department of Computer Science, FR–35, University of Washington, Technical Report 85–09–01, Sep. 1985 (Revised Dec. 1985), pp. 1–19.

Black, "The Eden Project: Overview and Experiences," Department of Computer Science, University of Washington, EUUG, Autumn '86 Conference Proceedings, Manchester, UK, Sep. 22–25, 1986, pp. 177–189.

Braine et al., "Object–Flow," 1997, pp. 418–419.

Ciancarini et al., "Coordinating Distributed Applets with Shade/Java," Feb. 1998, pp. 130–138.

Dalcambre et al., "Simulation of the Object Flow Model: A Conceptual Modeling Language for Object–Driven Applications," 1993, pp. 216–225.

Goldberg et al., "Smalltalk–80—The Language and its Implementation," Xerox Palo Alto Research Center, 1983 (reprinted with corrections, Jul. 1985), pp. 1–720.

Holman et al., "The Eden Shared Calendar System," Department of Computer Science, FR–35, University of Washington, Technical Report 85–05–02, Jun. 22, 1985, pp. 1–14.

Hsu, "Reimplementing Remote Procedure Calls," University of Washington, Thesis, Mar. 22, 1985, pp. 1–106.

Hutchinson, "Emerald: An Object–Based Language for Distributed Programming," a Dissertation, University of Washington, 1987, pp. 1–107.

Jacob, "The Use of Distributed Objects and Dynamic Interfaces in a Wide–Area Transaction Environment," SIGCOMMn '95 Workshop on Middleware: Cambridge, Mass., Aug. 1995, pp. 1–3.

Jul et al., "Fine–Grained Mobility in the Emerald System," University of Washington, ACM Transactions on Computer Systems, vol. 6, No. 1, Feb. 1988, pp. 109–133.

Jul, "Object Mobility in a Distributed Object–Oriented System," a Dissertation, University of Washington, 1989, pp. 1–154, (1 page Vita).

Koshizuka et al., "Window Real Objects: A Distributed Shared Memory for Distributed Implementation of GUI Applications," Nov. 1993, pp. 237–247.

Krasner et al., "Smalltalk–80: Bits of History, Words of Advice," 1983, Xerox Corporation, pp. 1–344.

Lavana et al., "Executable Workflows: A Paradigm for Collaborative Design on the Internet," Jun. 1997, 6 pages.

Proceedings of the Eighth Symposium on Operating Systems Principles, Dec. 14–16, 1981, ACM, Special Interest Group on Operating Systems, Association for Computing Machinery, vol. 15, No. 5, Dec. 1981, ACM Order No. 534810.

Proudfoot, "Replects: Data Replication in the Eden System," Department of Computer Science, University of Washington, Technical Report No. TR–85–12–04, Dec. 1985, pp. 1–156.

Pu, "Replication and Nested Transaction in the Eden Distributed System," Doctoral Dissertation, University of Washington, Aug. 6, 1986, pp. 1–179 (1 page Vita).

Trehan et al., "Toolkit for Shared Hypermedia on a Distributed Object Oriented Architecture," 1993, pp. 1–8.

Kolodner et al., "Atomic Garbage Collection: Managing a Stable Heap," ACM, 1989, pp. 15–25.

Osborn, "The Role of Polymorphism in Schema Evolution in an Object–Oriented Database," IEEE Transactions on Knowledge and Data Engineering, vol. 1, No. 3, Sep. 1989, pp. 310–317.

"Java (TM) Object Serialization Specification," Sun Microsystems, Inc., XP–002242372, <www.dei.estg.iplei.pt/P3/N/material/extra/serial–spec–JDK1 2.pdf>, Nov. 30, 1998 (76 pages).

Chan, P. et al., *The Java Class Libraries, 2nd Edition*, vol. 1, "Java.io ObjectinputStream," XP–002243027, pp. 1230–1232, 1262–1264, and 1283, Mar. 9, 1998 (7 pages).

Opyrchal et al., "Efficient Object Serialization in Java," Department of Electrical Engineering and Computer Science, University of Michigan, XP–002242373, May 31, 1999 (6 pages).

"Consumers Can View, Share Picture On–Line as Kodak Picture Network Goes 'Live'," Business Wire, Aug. 25, 1997, pp. 18–19.

"ISN Dataweb Sells Software, Hardware," Datamation, Apr. 1, 1996, p. 40.

"Kodak DC220 And DC260 Digital Cameras Are Shipping To Retailers Across The Country Cameras Are Optimized for USB Interface Supported in Windows 98," Business Wire, Jun. 24, 1998, pp. 42–44.

"Kodak demonstrates leadership across entire photographic category," M2 Presswire, Feb. 13, 1998, pp. 31–35.

"Kodak PhotoNet Online Makes It a Snap to Share Summer Photos," PR Newswire, Jul. 2, 1998, pp. 63–64.

"Kodak Picture Network Sends Prints Home From the Holidays," Business Wire, Dec. 29, 1997, pp. 58–60.

"Photo processing made easy on the Internet; Storm and PictureVision team up with Konica Corp.," Business Wire, Feb. 22, 1996, pp. 3–4.

"Seeing your photos a whole new way," Business Wire, Dec. 12, 1996, pp. 9–10.

"Webwatch: MCI Announces Internet Access,", Boardwatch Magazine, Jan. 1995.

Administrator's Guide, Netscape Enterprise Server, Version 3.0, Netscape Communications Corp., 1998.

Bandrowski, "Stores Without Doors: Kiosks Generate New Profits," Corporate Computing, Oct. 1992, pp. 193–195.

Bruno, "Working the Web," Data Communications, Apr. 1997, pp. 50–60.

Cohen, "Electronic Commerce," USC/Information Sciences Institute, Oct. 1989.

Conhaim, "Online shopping: a beginner's guide; includes related listing of videotex services," Link–Up, vol. 5, No. 6, p. 32, Nov. 1988.

Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1–6.

Ellsworth, "Boom Town," Internet World, Jun. 1995, pp. 33–35.

Estrin, "Inter–Organization Networks: Implications of Access Control Requirements for Interconnection Protocols," ACM, 1986, pp. 254–263.

Fleischer, "SkyMall's 'Supplier Network' Takes Flight", Retailtech, The Technology Magazine for Retail Executives, Apr. 1997.

Foley, "Managing Campus–Wide Information Systems: Issues and Problems," Capitalizing on Communication, ACM SIGUCCS XVII, 1989, pp. 169–174.

Fryxell, "eaasySABRE," Link–Up, May/Jun. 1996, pp. 10–11.

Gardner, "Kodak Follows Startup Into Online Photo Processing Business," Internet World, Sep. 8, 1997, pp. 5–6.

Gogan et al., "Open Market, Inc.: Managing in a Turbulent Environment," Harvard Business School Publishing, Aug. 29, 1996, pp. 1–30.

Israel et al., "Authentication in Office System Internetworks," ACM Transactions on Office Information Systems, vol. 1, No. 3, Jul. 1983, pp. 193–210.

Keller, "Smart Catalogs and Virtual Catalogs," Proceedings of the First USENIX Workshop of Electronic Commerce, USENIX Association, Jul. 11–12, 1995, pp. 125–131.

Klein et al., "TRADE'ex: The Stock Exchange of the Computer Industry." Harvard Business School Publishing, 1996, pp. 1–14.

Kodak Photonet Faq, PhotoNet Online, Jun. 14, 2002, pp. 1–3.

Kramer, "Netwatch; The AJC's Daily Online Guide; Get the picture: Kodak will send photos to Web," The Atlanta Journal and Constitution, Sec. Features, p. 08C, Jun. 5, 1997.

Lampson et al., "Authentication in Distributed Systems: Theory and Practice," ACM Transactions n Computer Systems, vol. 10, No. 4, Nov. 1992, pp. 265–310.

Lansky, "Without APS, Photo Life Goes on Via Internet," Photographic Trade News, Aug. 1996, pp. 19–23.

Lewis, "Pacific Bell, MCI to Expand Internet Service," The New York Times, sec. D, col. 1 at 3, Mar. 28, 1995.

LightSurf Instant Imaging –Press Releases, "Kodak And LightSurf Collaborate On Kodak Picture Center Online," LightSurf Technologies Inc., Jun. 14, 2002, pp. 1–3.

Louwerse et al., "Data Protection Aspects in an Integrated Hospital Information System," North–Holland Computers & Security 3, 1984, pp. 286–294.

McEnaney, "Point–and–Click Memory Sharing: Launches PhotoNet online digital photography and imaging services," Photographic Trade News, Sec. p. 23, Jan. 1997.

Miller, "Web posting as a photo processing option," USA Today, Section: Life, p. 17D, Dec. 13, 1996.

Morris et al., "Andrew: A Distributed Personal Computing Environment," Communications of the ACM, vol. 29, No. 3, Mar. 1986, pp. 184–201.

O'Mahony, "Security Considerations in a Network Management Environment," IEEE Network, May/Jun. 1994, pp. 12–17.

Oppen et al., "The Clearinghouse: A Decentralized Agent for Locating Names Objects in a Distributed Environment," ACM Transactions on Office Information Systems, vol. 1, No. 3, Jul. 1983, pp. 230–253.

Petersen, "New But Not Improved," Direct Magazine, Nov. 1995.

Press Release, "Sun Goes Live With The Kodak Picture Network," Sun Microsystems, Inc., Jun. 14, 2002, pp. 1–2.

Raeder, "Is there a Prodigy in your future?," Database Searcher, vol. 5, No. 6, p. 18.

Ramm et al., "Exu –A System for Secure Delegation of Authority on an Insecure Network," Ninth System Administration Conference, 1995 LISA IX, Sep. 17–22, 1995, pp. 89–93.

Satyanarayanan, "Integrating Security in a Large Distributed System," ACM Transactions on Computer Systems, vol. 7, No. 3, Aug. 1989, pp. 247–280.

Schroeder et al., "Experience with Grapevine: The Growth of a Distributed System," ACM Transactions on Computer Systems, vol. 2, No. 1, Feb. 1984, pp. 3–23.

Senn, "Capitalizing on Electronic Commerce: The Role of the Internet in Electronic Markets," Information Systems Management, Summer 1996, pp. 15–24.

Steinke, "Design Aspects of Access Control in a Knowledge Base System," Computers & Security, 10, 1991, pp. 612–625.

Stern, "Industry Net," Link–Up, Mar./Apr. 1995, p. 10.

Tanenbaum et al., "Distributed Operating Systems," Computing Surveys, vol. 17, No. 4, Dec. 1985, pp. 419–470.

The Wall Street Journal, "Barclays Is Opening An 'Electronic Mail' For Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Trommer, "Thomas Unveils Online Purchasing Network – Eases Product Sourcing And Ordering Through EDI," Electronic Buyers' News at 60, Dec. 11, 1995.

Van Den Berg et al., "Advanced Topics of a Computer Center Audit," North–Holland Computers & Security 3, 1984, pp. 171–185.

Van Der Lans, "Data Security in a Relational Database Environment," North–Holland Computers & Security 5, 1986, pp. 128–134.

Welz, "New Deals: A ripening Internet market, secure systems and digital currency are reshaping global commerce," Internet World, Jun. 1995, pp. 36–41.

Wobber et al., "Authentication in the Taos Operating System," ACM, 1993, pp. 256–269.

Wyatt, "Netscape Enterprise Server," Prima Publishing, 1996.

* cited by examiner

METHOD AND SYSTEM FOR ESTABLISHING TRUST IN DOWNLOADED PROXY CODE

RELATED APPLICATION

The present application is related to and claims the benefit of U.S. Provisional Patent Application No. 60/128,406, entitled "RMI Security," filed Apr. 8, 1999, which is relied upon and is incorporated herein by reference.

FIELD OF THE INVENTION

The present invention relates generally to data processing systems and, more particularly, to using downloaded code to provide secure communication between a client and a remote service in a distributed system.

BACKGROUND OF THE INVENTION

Today's distributed systems can be made up of various components, including both hardware and software. Nodes in distributed systems typically communicate via a network such as the Internet. One means of communication between programs in a distributed system is downloading code from one program to another. For example, a client (e.g., a program running on a node in a distributed system) can access a service running on a remote node by downloading code from the remote service.

A "service" refers to a resource, data, or functionality that can be accessed by a user, program, device, or another service and that can be computational, storage related, communication related, or related to providing access to another user. Examples of services include devices, such as printers, displays, and disks; software, such as applications or utilities; information, such as databases and files; and users of the system.

In a distributed system implemented using the Java™ programming language, services appear programmatically as objects, with interfaces that define the operations available from the service. In the Java™ programming language, a "class" provides a template for the creation of "objects" (which represent items or instances manipulated by the system) having characteristics of that class. Thus, a class defines the type of an object. Methods associated with a class are generally invoked on the objects of the same class or subclass. The Java™ programming language is described in *The Java™ Language Specification* by James Gosling, Bill Joy, and Guy Steele, Addison-Wesley, 1996, which is incorporated herein by reference.

In a distributed system that depends on downloaded code, there is the danger that the downloaded code may be untrustworthy. For example, the code could carry a virus or disguise its true source, causing the user of the downloaded code to disclose confidential information to an unknown party. Therefore, it is desirable to enable users in a distributed system to confirm that downloaded code is trustworthy.

SUMMARY OF THE INVENTION

A system consistent with the present invention enables a user in a distributed system to determine whether downloaded code is trustworthy before using the downloaded code to communicate with others in the distributed system. For example, if a client downloads code from a service, the client can verify that both the service and the downloaded code are trustworthy before using the code to communicate with the service. "Trustworthy" code is code that the client knows will enforce the client's security constraints (e.g., mutual authentication, confidentiality, and integrity) when communicating with the service.

In accordance with one implementation of the present invention, code is downloaded from a server, and a set of constraints to implement secure communication with the server is determined. Secure code is then used to verify that the downloaded code will enforce the set of constraints when the downloaded code is used to communicate with the server.

In accordance with another implementation of the present invention, a first proxy containing code for communication purposes is downloaded, and a second proxy containing code for communication purposes is obtained from the first proxy. A trustworthiness verification routine is used to determine whether the second proxy is trustworthy, and when it has been determined that the second proxy is trustworthy, the second proxy is used to determine whether a server is trustworthy. When it has been determined that the server is trustworthy, a trustworthiness verification routine is requested from the server by using the second proxy and this verification routine is then used to identify the trustworthiness of the first proxy. When it has been determined that the second proxy is trustworthy, that the server is trustworthy, and that the first proxy is trustworthy, the first proxy is used to invoke a method on the server.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

A distributed system suitable for practicing methods and systems consistent with the present invention can be implemented using the Jini™ architecture. A Jini™ system is built around one or more lookup services that list the services available in the distributed system. When a service joins the network, it uses a process called discovery to locate the lookup service or services for the network. The service registers by passing a proxy object to each lookup service. The proxy object is a Java™ object implementing the interfaces of the corresponding service. When a client (e.g., a program) wishes to use a service, the client interacts with the lookup service and downloads the proxy to facilitate use of the service. The Jini™ architecture is described in more detail in Arnold, *The Jini™ Specification*, Addison-Wesley (1999).

A system consistent with the present invention enables a program in a distributed system to determine whether downloaded code is trustworthy before using the downloaded code to communicate with other programs or services in the distributed system. For example, if a client downloads code from a service, the client can verify that both the service and the downloaded code are trustworthy before using the code to communicate with the service. "Trustworthy" code is code the client knows will enforce the client's security constraints in communicating with the service.

These constraints can include, for example, integrity, anonymity, mutual authentication, delegation, and confidentiality. The "integrity" constraint ensures that messages will not be tampered with in transit, the "anonymity" constraint permits the identity of the client to stay unknown to the service, and "mutual authentication" refers to the client and service verifying their identities to one another. The "delegation" constraint allows the service to make calls to other computers using the client's identity, and the "confidentiality" constraint ensures that messages are private, e.g., by using encryption.

The constraints attached to a proxy are included in the serialized version of the proxy. As part of RMI system 122, an object, such as a proxy, is converted into a serialized version of itself before being passed. The serialized object contains enough information to enable the recipient to identify and verify the Java™ class from which the contents of the object were saved and to restore the contents to a new instance. Object serialization is explained in the Java™ Object Serialization Specification, available at http://web2.java.sun.com/products//jdk/1.3/docs/guide/serialization/spec/serialTO C.doc.html, which is incorporated herein by reference. When a client trusts the downloaded code to enforce the client's security constraints and trusts the service, the client can trust communicating through the proxy to the service and can trust the service to do what the client asks, and not something harmful.

Figure 1:
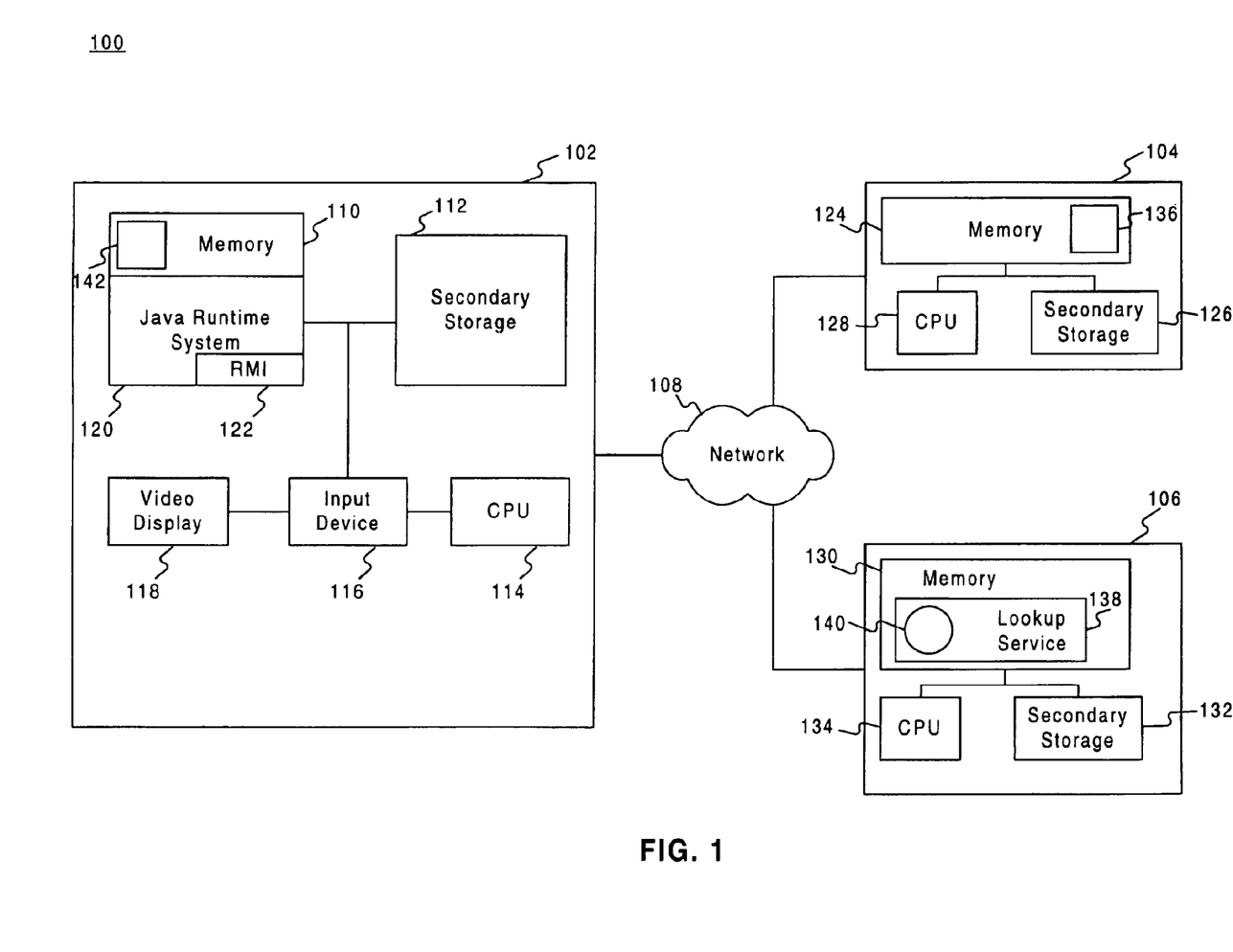
FIG. 1 depicts a distributed system suitable for practicing methods and systems consistent with the present invention.

FIG. 1 depicts a distributed system 100 suitable for practicing methods and systems consistent with the present invention. Distributed system 100 includes a plurality of computers 102, 104, and 106, communicating via a network 108. Network 108 may be a local area network, wide area network, or the Internet. Computer 102 includes a memory 110, a secondary storage device 112, a central processing unit (CPU) 114, an input device 116, and a video display 118. Memory 110 includes a client program 142 and Java™ runtime system 120, which includes a Java™ remote method invocation (RMI) system 122.

Computers 104 and 106 may be similarly configured, with computer 104 including memory 124, secondary storage device 126, and CPU 128, and computer 106 including memory 130, secondary storage device 132, and CPU 134. Memory 124 of computer 104 includes a service 136, and memory 130 of computer 106 includes a lookup service 138 that defines the services available in one part of distributed system 100. Lookup service 138 contains one proxy object for each service within that part of distributed system 100. Each "proxy object" corresponds to a service in the distributed system and implements interfaces corresponding to methods available from a service.

For example, if service 136 were a database service, the corresponding proxy object 140 would implement database interfaces such as "find" or "sort." for a proxy to the database service. In response, lookup service 138 returns proxy object 140 corresponding to database service 136 to the client. Lookup services are explained in greater detail in U.S. patent application Ser. No. 09/044,931, entitled "Dynamic Lookup Service in a Distributed System," which is incorporated herein by reference.

Figure 2:
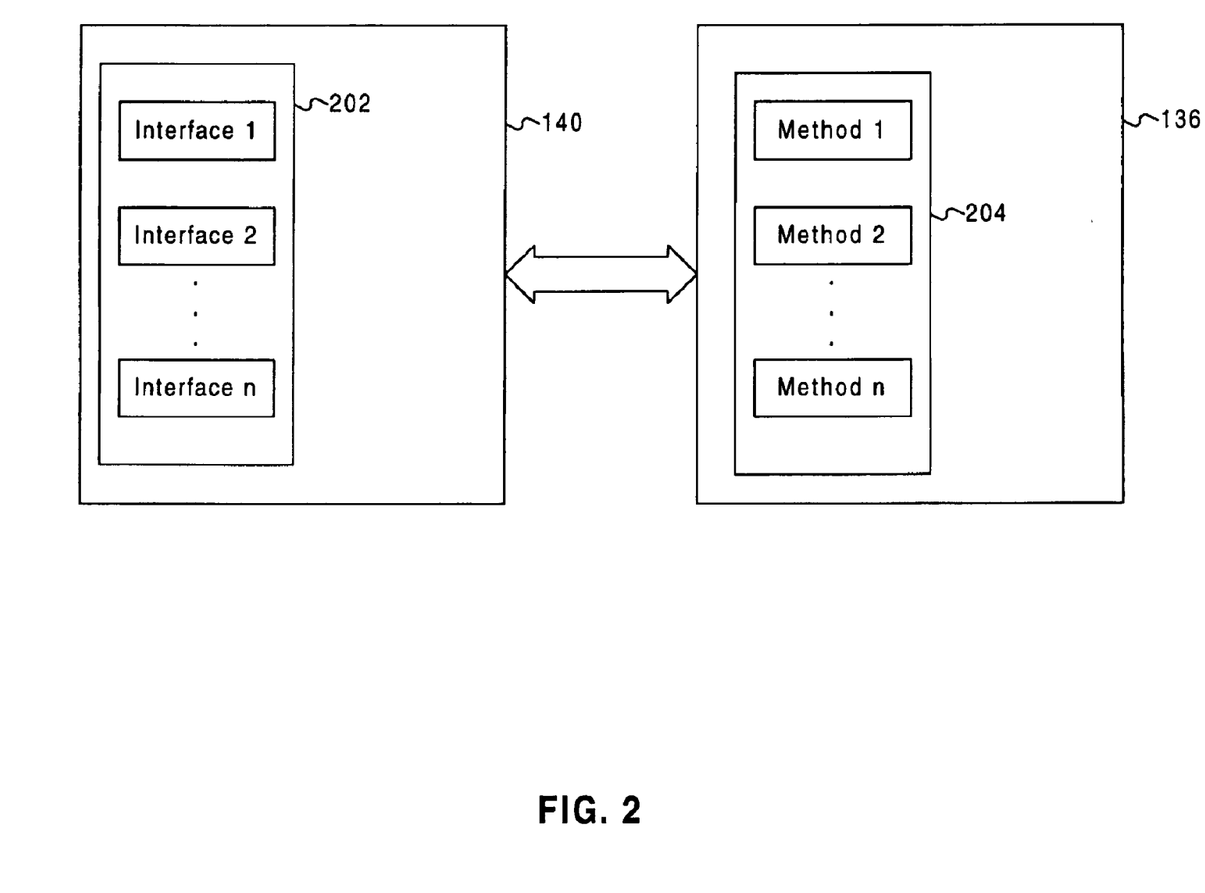
FIG. 2 depicts the logical interaction between a client and a service once the client has downloaded a proxy.

FIG. 2 depicts the logical interaction between client program 142 and service 136 once the client has downloaded proxy 140. Proxy 140. Implements one or more interfaces 202 corresponding to the methods 204 offered by service 136. Client 142 invokes methods on proxy 140. Proxy 140 processes method invocations, communicates with service 136 to execute the requests of client 142, and returns results. The protocol between proxy 140 and service 136 is not set by the Jini™ system; instead, it is determined by the service and its proxy. This enables a client to communicate with a service it may have never seen before without knowing or caring how the service works.

In this way, the Jini™ architecture relies on downloaded code to provide services in a dynamic and flexible way. Once a client downloads a proxy object, the client invokes methods on the proxy to communicate with the remote service. However, the proxy may be implemented using code that the client does not trust. Before sharing any critical data with the service, the client needs to establish trust in the proxy, the service, or both.

Figure 3:
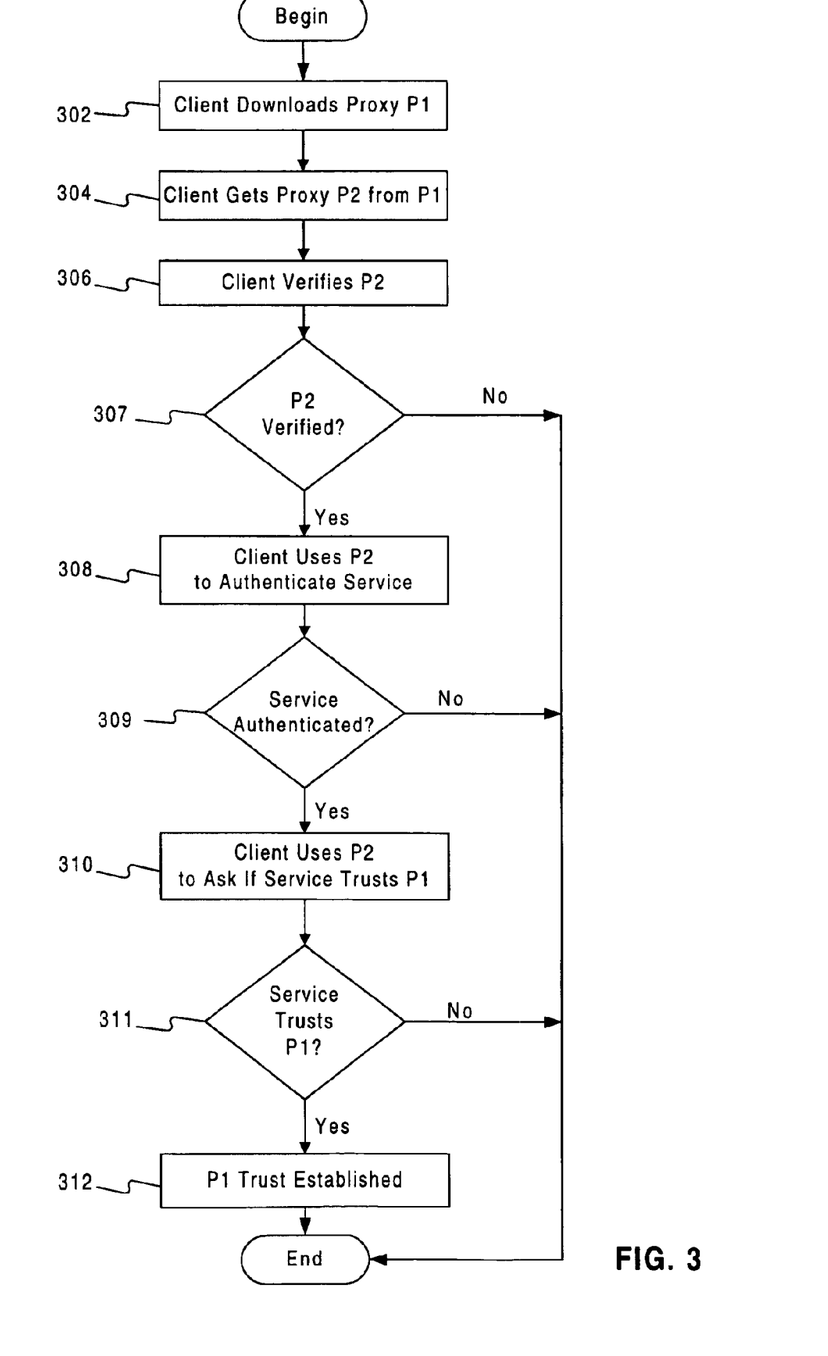
FIG. 3 is a high-level flow chart of an exemplary method for establishing trust in a downloaded proxy in accordance with methods and systems consistent with the present invention.

FIG. 3 is a high-level flow chart of an exemplary method for establishing trust in a downloaded proxy in accordance with methods and systems consistent with the present invention. The exemplary method enables a client to use code that can be verified locally to communicate with a remote service. Using the locally-verified code, the client verifies the remote service and then asks the service whether the service trusts the downloaded proxy. If the client has verified the service and the service trusts the proxy, then the client has established transitive trust in the proxy.

With reference to FIG. 3, the exemplary method begins when the client downloads the proxy, P1, from a lookup service (step 302). The client then asks P1 for a second proxy to the service, P2, by invoking a method on P1 corresponding to a method on the service (step 304). The client examines the code in P2 to verify that P2 uses only trusted code (step 306). If the client verifies P2 (step 307), then the client uses P2 to authenticate the service by invoking a method on P2 (step 308). If the service is authenticated (step 309), the client then uses P2 to ask the service if the service trusts P1's code, by invoking a method on P2 to obtain a proxy verifier from the service, and then passing P1 to the proxy verifier (step 310). If the service trusts P1 (step 311), then the client can trust P1 (step 312). In this manner, the client uses local, trusted code to establish trust in a downloaded proxy.

The VerifyProxyTrust Method

The exemplary method described above will now be explained using the Java™ RMI Security Subsystem, part of RMI system 122. The Security Subsystem defines classes and interfaces that ensure secure communication between remote objects. One class provided by the RMI Security Subsystem is the Security class, which includes the verifyProxyTrust method. The verifyProxyTrust method establishes trust in downloaded code and is defined as follows:

```
public static void verifyProxyTrust (
    Object proxy,
    SecurityConstraints constraints)
    throws RemoteException;
```

The verifyProxyTrust method in RMI system 122 is called by client 142 once the client downloads proxy 140, before the client makes any other use of the proxy. As described below, the method will establish trust in the proxy by confirming that the proxy will correctly implement the RemoteSecurity interface, part of the Security class.

When a remote service instantiates its proxy, the service can include the RemoteSecurity interface, which provides methods enabling a client to attach security constraints to the proxy or to query the service to determine the service's security constraints. The RemoteSecurity interface is defined as follows:

```
public interface RemoteSecurity {
    RemoteSecurity setClientConstraints (
        SecurityConstraints constraints);
    SecurityConstraints getClientConstraints( );
    SecurityConstraints getServerConstraints (String name,
        Class[ ] parameterTypes);
        throws NoSuchMethodException, RemoteException;
    boolean equalsIgnoreConstraints(Object obj);
}
```

The setClientConstraints method allows a client to make a copy of the proxy with a new set of constraints selected by the client. The getClientConstraints method returns the current client constraints attached to the proxy. The getServerConstraints method returns the server's constraints for a particular remote method implemented by the proxy.

As explained above, the constraints can include, for example, integrity, anonymity, mutual authentication, delegation, and confidentiality. When the verifyProxyTrust method determines that the proxy will enforce the client's constraints by correctly implementing the RemoteSecurity interface, the proxy is "trusted."

Figure 4A:
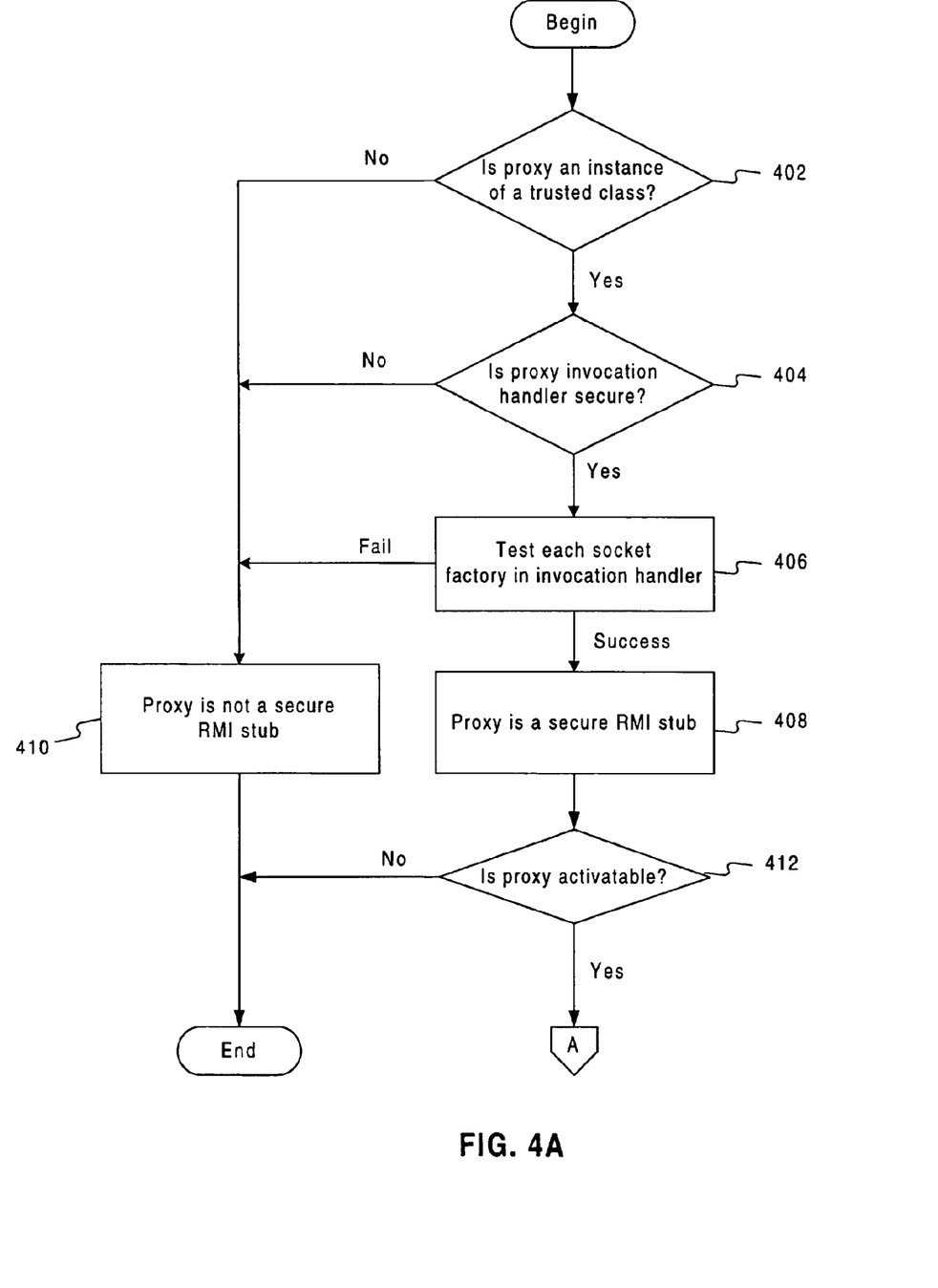
FIGS. 4A and 4B are flow charts depicting the steps of the verifyProxyTrust method for establishing trust in a downloaded proxy.
Figure 4B:
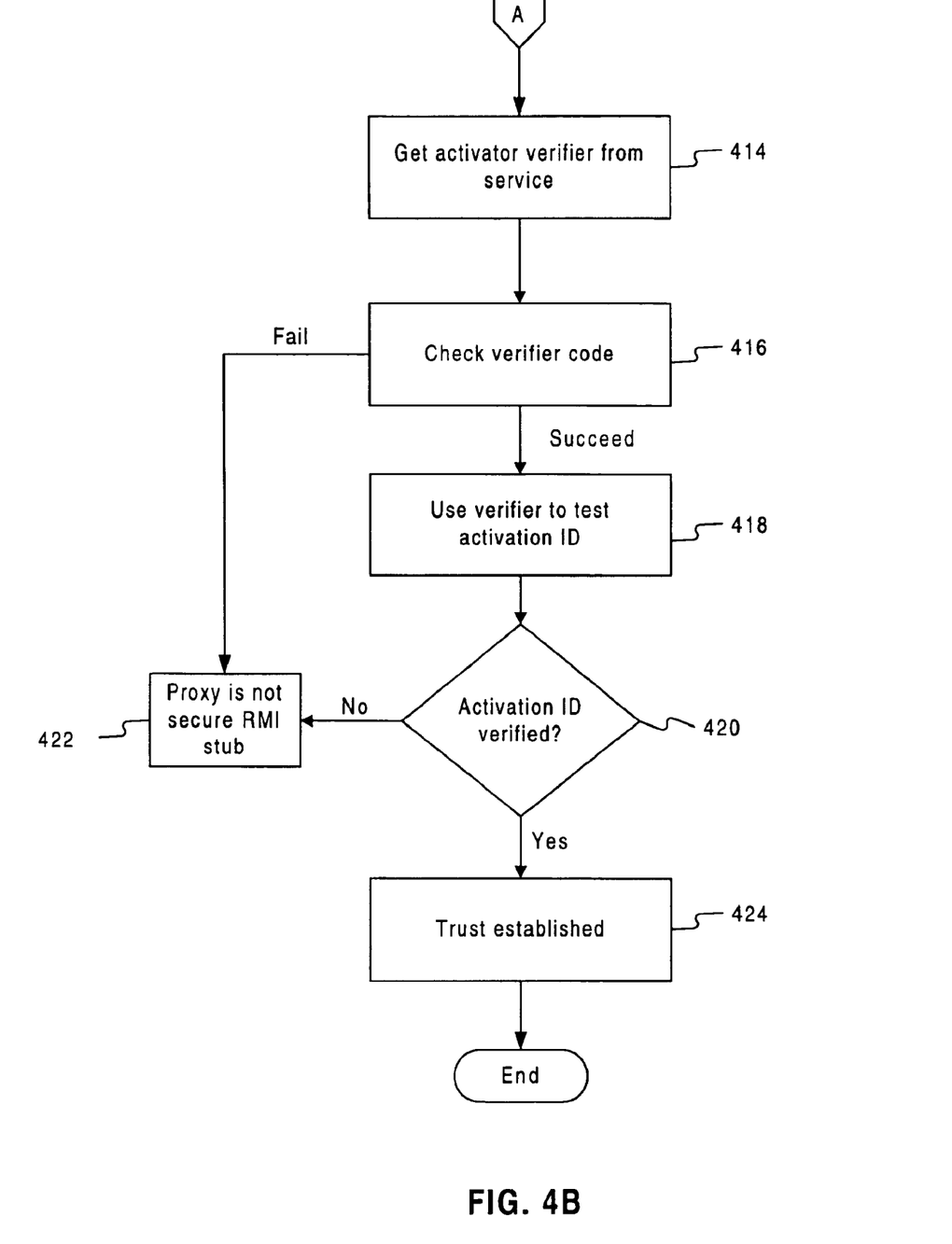

FIGS. 4A and 4B are flow charts showing the steps of the verifyProxyTrust method. When a client calls verifyProxyTrust, the call has as its parameters the proxy and the client's security constraints.

As shown in steps 402 to 410 of FIG. 4A, the verifyProxyTrust method first determines whether the downloaded proxy is a secure RMI stub. A stub is one example of a proxy, created by the RMI System, that uses the RMI protocol to communicate with a service. A secure RMI stub is an instance of a class generated by the java.lang.reflect.Proxy class provided by the Java™ programming language. The methods of the Proxy Class include Proxy.isProxyClass, which returns true if it is passed a proxy class that was generated by the Proxy Class, Proxy.getInvocationHandler, which returns the invocation handler associated with the proxy instance passed as its argument, and Proxy.getProxyClass, which generates a java.lang.Class object for a proxy given a class loader and an array of interfaces. These methods and the java.lang.reflect.Proxy class are explained in further detail in the "Java™ 2 Platform, Standard Edition, v 1.3 API Specification," available at http://java.sun.com/products/jdk/1.3/docs/api/java/lang/reflect/Proxy.html, and incorporated herein by reference.

The verifyProxyTrust method calls the Proxy.isProxyClass method, passing the class of the proxy as a parameter, to determine whether the proxy is an instance of a trusted generated Proxy class (step 402). As described above, the Proxy.isProxyClass method will return true if and only if the specified class was dynamically generated to be a trusted proxy class.

If the Proxy.isProxyClass method returns true, the proxy is an instance of a trusted class, and the verifyProxyTrust method tests the invocation handler of the proxy to determine if it is an instance of a trusted class (step 404). Each secure RMI stub has an invocation handler used to invoke methods on the proxy. The verifyProxyTrust method calls the local Proxy.getInvocationHandler method, passing the proxy as a parameter. The getInvocationHandler method returns the invocation handler of the proxy, and the verifyProxyTrust method then calls the local instanceof operator to determine whether the proxy's invocation handler is an instance of a local trusted class, SecureInvocationHandler. The local trusted class SecureInvocationHandler is specified in the Security class in RMI 122. The corresponding local calls made by verifyProxyTrust are:

Proxy.isProxyClass(proxy.getClass( ))
handler=Proxy.getInvocationHandler(proxy)
handler instanceof SecureInvocationHandler As explained above, these methods are provided by the java.lang.reflect.Proxy class of the Java™ programming language.

If the proxy is an instance of a trusted class and the invocation handler is secure, then each socket factory instance contained in the invocation handler is checked (step 406). A socket is an end-point to a communication path between two processes in a network. A socket factory is an object that implements a method to create a new socket. Socket factories are described in more detail at http://java.sun.com/products/jdk/1.3/docs/api/java/net/SocketImplFactory.html. The class of each socket factory instance in the proxy is compared to a local list of trusted socket factory classes.

To obtain the list of trusted socket factory classes, the verifyProxyTrust method uses a local configuration database to obtain TrustVerifier. TrusterVerifiers are provided as part of the Java™ RMI Security Subsystem in RMI system 122, and are defined as follows:

```
public interface TrustVerifier {
    boolean trustedConstraintClass(Class c);
    boolean trustedPrincipalClass(Class c);
    boolean trustedClientSocketFactoryClass(Class c);
    boolean trusted Proxy(Object proxy,
        SecurityConstraints constraints)
        throws RemoteException;
}
```

The local configuration database contains a list of TrustVerifier instances that implement methods for testing the security of a given proxy or class. The trustedClientSocketFactoryClass method will return true if the given class is a trusted socket factory class defined in RMI 122. For each socket factory instance in the proxy, the verifyProxyTrust method calls the trustedClientSocketFactoryClass method of each TrustVerifier instance, passing the socket factory class as a parameter. If at least one trustedClientSocketFactoryClass method returns true for each socket factory, the proxy is a secure RMI stub (step 408). If the proxy is not an instance of a trusted Proxy class, or if the invocation handler is not secure, or if the socket factories are not trusted, then the proxy is not a secure RMI stub (step 410).

Before continuing with the description of FIG. 4A, it is important to understand the difference between a unicast and an activatable stub. An RMI stub can be either unicast or activatable, depending on how it was exported by the service it represents. A unicast stub works until its service goes down. By contrast, an activatable stub will still work after its service goes down because an activatable stub is capable of restarting the service, if necessary. Each activatable stub contains an Activation ID consisting of information needed for activating the stub's corresponding object, e.g., a remote reference to the object's activator and a unique identifier for the object. Activatable objects are explained in more detail in the Java™ 2 Platform, Standard Edition, v.1.2.2 API Specification, available at http://www.java.sun.com/products/jdk/1.2/docs/api/java/rmi/activation/package-summary.html, incorporated herein by reference.

If the proxy is activatable, i.e., the proxy contains an Activation ID, (step 412) then the verifyProxyTrust method takes additional steps to determine whether the proxy is a secure RMI activatable stub. The verifyProxyTrust method obtains an activator verifier by making a remote call, using the proxy's invocation handler, to the remote service's getActivatorVerifier method, passing the client constraints as parameters (step 414). The getActivatorVerifier method is provided in the RMI system of an activatable service to enable a client to verify a proxy's Activation ID. The call to getActivatorVerifier returns an activator verifier plus optional codebase and signer information. The activator verifier is an object received from the service containing code that implements the verifyActivatorTrust method, explained below. The codebase information is the location from which the code, i.e., the activator verifier, should have been downloaded, e.g. a uniform resource locator (URL). The signer information identifies the creator or creators of the code, i.e., the activator verifier.

Because the verifier could have been downloaded, the verifyProxyTrust method checks that the activator verifier can be trusted using the codebase and signer information (step 416). If the service returned codebase information, the verifyProxyTrust method calls a local RMIClassLoader.get-ClassAnnotation method, which returns the location where the activator verifier code was obtained. The verifyProxyTrust method compares that location to the codebase information from the service. If they are different, the activator verifier is not used because its code is not trusted. If one or more signers is specified by the service, the verifyProxyTrust method obtains the signers of the verifier by calling the local Class.getSigners method and compares them to the signers specified by the service. If they are different, the activator verifier is not used because its code is not trusted.

In this way, the verifyProxyTrust method uses local methods to confirm the activator verifier code, which may have been downloaded and therefore could be corrupted. If the service did not specify either codebase or signer information, the verifyProxyTrust method confirms that the activator verifier was not downloaded, i.e., that the activator verifier is local, and therefore trusted. To do this, the verifyProxyTrust method compares the classloader of the verifier's class to the context classloader of the current thread or an ancestor of the context classloader. If they are the same, then the activator verifier was not downloaded, and can be trusted.

Once the verityProxyTrust method ensures that the activator verifier can be trusted, as described above, it extracts the Activation ID from the stub and calls the verifyActivatorTrust method of the verifier, passing the Activation ID as a parameter (step 418). The verifyActivatorTrust method will return normally if the service trusts the activation ID passed to it (step 420). If any of these calls do not return normally, i.e., throws an exception, then the proxy is not a secure RMI activatable stub (step 422), otherwise trust is established (step 424).

Trusting a Proxy Other than a Secure RMI Stub

If the proxy is not a secure RMI stub, the client can still establish trust in the proxy. If the proxy's class has a method with the signature ProxyTrust getSecureProxy( ), then the verifyProxyTrust method makes the following local calls:

proxy2=proxy.getSecureProxy( );
verifyProxyTrust(proxy 2, constraints).

In this manner, the proxy's verifyProxyTrust method is called recursively to get down to a secure RMI stub. The original verifyProxyTrust, i.e., the method called by the client program, then makes a call to proxy2's getProxyVerifier method.

In response, the remote service returns a proxy verifier plus optional codebase and signer information. The verifyProxyTrust method checks the proxy verifier code using the codebase and/or signer information in the same way as described above with respect to the activator verifier. Once the verifyProxyTrust method ensures that the proxy verifier can be trusted, it makes a local call to the verifyProxyTrust method of the verifier, passing the proxy as a parameter. If any of these calls do not return normally, i.e., throws an exception, then the proxy is not trusted.

If the proxy is not a secure RMI stub and does not have the getSecureProxy method, then an ordered list of TrustVerifier instances is obtained from the local configuration database, as described above. The verifyProxyTrust method calls the trustedProxy method of each TrustVerifier instance, with the proxy and client constraints as parameters. The trustedProxy method returns true if the given proxy is known to be trusted to correctly implement the RemoteSecurity interface, and false otherwise. If any method returns true, then trust is established. If none returns true, trust is not established.

Although systems and methods consistent with the present invention are described as operating in a Jini™ system using the Java™ programming language, one skilled in the art will appreciate that the present invention can be practiced in other systems and other programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Sun, Sun Microsystems, the Sun Logo, Java™, and Jini™ trademarks are trademarks or registered trademarks of Sun Microsystems Inc. in the United States and other countries.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method in a distributed system, comprising the steps of:
    downloading code from a server by a client;
    determining a set of constraints specified by the client for conducting secure communication with the server via the downloaded code; and
    using secure code verified locally by the client to determine whether the downloaded code will enforce the set of constraints specified by the client when the downloaded code is used to communicate with the server.

2. The method of claim 1, further comprising the step of:
    using the downloaded code to invoke a method on the server, wherein the downloaded code enforces the set of constraints on the server.

3. The method of claim 1, wherein the set of security constraints include at least one of integrity, anonymity, mutual authentication, delegation, and confidentiality.

4. A method in a distributed system for ensuring trustworthiness of a first proxy, comprising the steps of:
    downloading the first proxy containing code for communication purposes;

using the first proxy to obtain a second proxy containing code for communication purposes;

determining whether the second proxy is trustworthy by using a trustworthiness verification routine;

determining whether a server is trustworthy by using the second proxy when it has been determined that the second proxy is trustworthy;

requesting the server to determine whether the first proxy is trustworthy by using the second proxy when it has been determined that the server is trustworthy; and using the first proxy to invoke a method on the server when it has been determined that the first proxy is trustworthy, that the second proxy is trustworthy, and that the server is trustworthy.

5. The method of claim 4, wherein the requesting step further comprises the substeps of:

receiving a trust verifier routine from the server;

receiving codebase information and signer information for the trust verifier from the server;

determining whether the trust verifier routine is trustworthy using the codebase information and the signer information; and when it has been determined that the trust verifier routine is trustworthy, using the trust verifier routine to determine whether the first proxy is trustworthy.

6. A distributed system comprising:

a server computer, comprising:
a memory with a service; and
a processor that runs the service; and a client computer, comprising:
a memory with a proxy that facilitates use of the service, a client program that invokes a method of the service using the proxy and specifies a set of constraints for conducting secure communication with the service, and a secure verifier that determines whether the proxy will enforce the set of constraints when communicating with the service; and
a processor that runs the client program.

7. The distributed system of claim 6, wherein the server computer and the client computer communicate via the Internet.

8. The distributed system of claim 6, wherein the server computer and the client computer communicate via a local area network.

9. The distributed system of claim 6, wherein the security constraints include at least one of integrity, anonymity, mutual authentication, delegation, and confidentiality.

10. The distributed system of claim 6, wherein the security constraints are set by the service.

11. A computer-readable medium containing instructions for controlling a data processing system to perform a method in a distributed system, the method comprising the steps of:

downloading code from a server by a client;

determining a set of constraints specified by the client for conducting secure communication with the server via the downloaded code; and using secure code verified locally by the client to determine whether the downloaded code will enforce the set of constraints specified by the client when the downloaded code is used to communicate with the server.

12. The computer-readable medium of claim 11, wherein the method further comprises the step of:

using the downloaded code to invoke a method on the server, wherein the downloaded code enforces the set of constraints on the server.

13. A computer-readable medium containing instructions for controlling a data processing system to perform a method in a distributed system the method comprising the steps of:

downloading the first proxy containing code for communication purposes;

using the first proxy to obtain a second proxy containing code for communication purposes;

determining whether the second proxy is trustworthy by using a trustworthiness verification routine;

determining whether a server is trustworthy by using the second proxy when it has been determined that the second proxy is trustworthy;

requesting the server to determine whether the first proxy is trustworthy by using the second proxy when it has been determined that the server is trustworthy; and using the first proxy to invoke a method on the server when it has been mined that the first proxy is trustworthy, that the second proxy is trustworthy, and that the server is trustworthy.

* * * * *

UNITED STATES PATENT AND TRADEMARK OFFICE
CERTIFICATE OF CORRECTION

PATENT NO.   : 6,901,518 B1
DATED        : May 31, 2005
INVENTOR(S)  : Robert W. Scheifler et al.

It is certified that error appears in the above-identified patent and that said Letters Patent is hereby corrected as shown below:

Column 10,
Line 42, "mined" should read -- determined --.

Signed and Sealed this

Sixteenth Day of August, 2005

JON W. DUDAS
*Director of the United States Patent and Trademark Office*